United States Patent Office 3,567,394
Patented Mar. 2, 1971

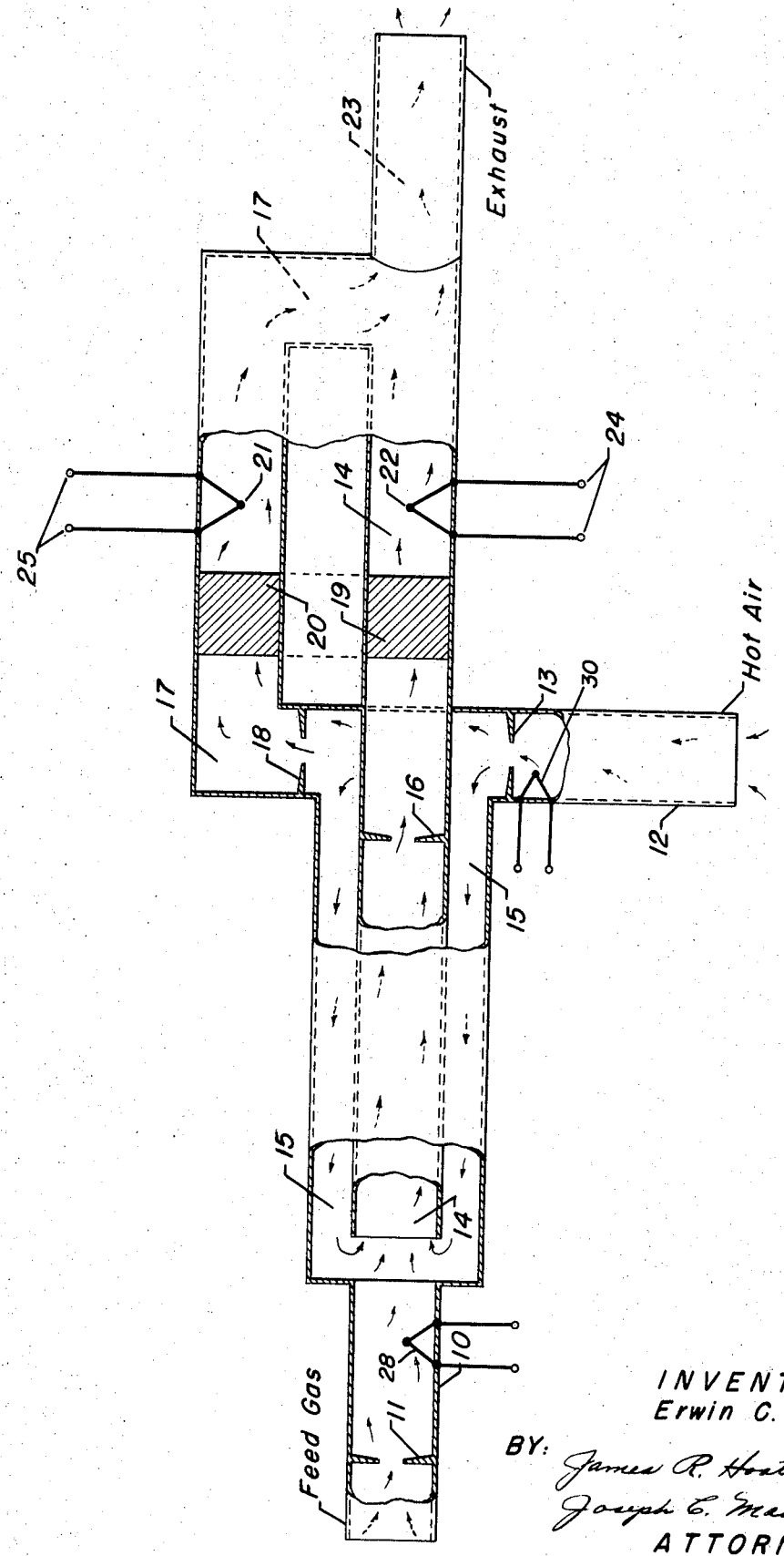

3,567,394
IMPURITY DETECTOR FOR GASEOUS STREAMS
Erwin C. Betz, Palatine, Ill., assignor to Universal Oil
Products Company, Des Plaines, Ill.
Filed May 16, 1968, Ser. No. 729,718
Int. Cl. G01n 27/00
U.S. Cl. 23—254                           3 Claims

ABSTRACT OF THE DISCLOSURE

System for determining impurity concentration in a gaseous atmosphere. A known impurity gaseous stream and an unknown impurity gaseous stream are passed through parallel conversion zones to produce separate conversion product streams. These separate conversion product streams are passed through detection devices and the signal generated from such devices is quantitatively correlated with the impurity content of the unknown stream.

BACKGROUND OF THE INVENTION

This invention relates to a system for detecting impurities contained in a gaseous atmosphere. It particularly relates to an instrument for transporting, measuring, indicating and/or recording continuously the impurity concentration in a gaseous stream.

In many industrial applications there is a need for monitoring the exhaust gases from such sources as drying ovens, paint and varnish applications, chemical processes, internal combustion engines, and many other sources of gaseous streams usually exhausted to the atmosphere. Recently, these applications have been the subject of governmental regulation through air pollution laws designed to limit the emission of undesirable constituents into our atmosphere.

The prior art schemes for detecting these air pollutants or impurities contained in a gaseous atmosphere have been gas chromatographic apparatus usually of the multiple column design. As those skilled in the art know well, the gas chromatograph is essentially a complicated device requiring close operating control and skill, long sample probes, and considerable floor space for installation.

Accordingly it would be desirable to have a relatively small, simple and reliable instrument which can transport, measure, indicate, record and/or control continuously the performance of, for example, air correction devices.

SUMMARY OF THE INVENTION

Therefore, it is an object of the present invention to provide a compact system for transporting and determining impurity concentration in a gaseous atmosphere. A typical system would measure approximately 1 cubic foot. It would be self-contained and could be directly mounted to individual ovens.

It is another object of this invention to provide a system for determining the hydrocarbon concentration in gaseous streams from sources such as drying ovens paint and varnish applications, etc.

It is a specific object of this invention to provide a system for determining hydrocarbon contaminant content in an air stream utilizing a facile and economic apparatus.

According to one embodiment of the invention, there is provided a system for determining impurity concentration in a gaseous atmosphere which comprises, in combination: (a) a first and second flow channel within a conduit, the first channel having associated therewith a conversion zone specific for converting said impurity to conversion products and the second channel having associated therewith another conversion zone specific for converting a similar impurity in a reference gas stream to conversion products; (b) means for introducing a sample of said gaseous atmosphere into said first channel; (c) means for introducing a reference gas into said second channel; (d) first detector means in said first channel at a locus sufficient to detect said conversion products produced therein; (e) second detector means in said second channel at a locus sufficient to detect said conversion products produced therein; (f) means for generating an output signal responsive to said first and second detector means; and, (g) means for correlating said output signal with the concentration of said impurity in the sample gaseous atmosphere.

Another embodiment of the invention includes the system hereinabove wherein volume control means are associated with said first and second channels so that substantially equal volume flow per unit time of each gas stream passes over each said catalyst.

In essence, therefore, the present invention provides a system for determing impurity concentration in a gaseous atmosphere wherein a known impurity gaseous stream and an unknown impurity gaseous stream passed through parallel conversion zones to produce separate conversion product streams. These separate product streams are then passed over suitable detection devices for the generation of an output signal which is then quantitatively correlated with the impurity content of the unknown stream. In a typical operation, the sample gaseous atmosphere comprises air contaminated with hydrocarbons.

DETAILED DESCRIPTION OF THE INVENTION

The feed to the inventive system may be derived from any source available to those skilled in the art. The system is designed primarily for transporting and determining the impurity concentration in a gaseous atmosphere. Therefore, the feed will generally comprise a gaseous stream contaminated with an undesirable component. Examples of suitable feed gas streams include the exhaust gases from drying ovens, catalyst regeneration facilities, vents from paint and varnish applications, and the like. Typically, the feed gas stream will comprise air which is contaminated with small quantities of pollutants, such as hydrocarbons.

The conversion zones referred to in the embodiments herein may be any means known to those skilled in the art for transforming or converting a specific predetermined contaminant into a conversion product more amenable for detection by well known detection devices. Such conversion zone may be a combustion furnace which is heated electrically or externally for the pyrolytic conversion of the contaminants into conversion products or may be of any type suitable to convert hydrocarbon into for example, water and carbon dioxide. Preferably, the conversion zones are catalytic and may include a catalyst chamber filled with a metal oxide catalyst, e.g. copper oxide, or it may be filled with a catalyst supported on metal screen, ribbon or wire filament which can be heated by applying electrical current across said filament. Broadly speaking, the term "conversion zone" will include all auxiliary components, such as preheating means, temperature control means such as a thermostat, catalyst means, and the like. Those skilled in the art familiar with general knowledge and the specific teachings contained herein will be able to devise appropriate conversion zones to achieve the benefits shown to be gained by the practice of this ivention.

The detection device may be of any known or suitable type for selectively detecting the desired conversion product produced in the conversion zones, such as, for example, water and/or carbon dioxide. These devices may be a thermal conductivity cell, a gas-density balance, an infrared analyzer, a hydrogen flame ionization detector, and other known commonly used detection devices. It is within the concepts of the present invention that these devices be of the same type or may be of different types depending upon the desires of those skilled in the art. Preferably, however, the devices will comprise thermistors arranged and connected into a Wheatstone Bridge circuit.

As previously mentioned, it is distinctly preferred that the conversion zones be catalytic in nature. Accordingly, the sample gaseous stream and the reference gaseous stream must be heated in order for the conventional catalytic agents to be economically effective. Therefore, the first channel means referred to herein is internally placed within a larger conduit, such that the larger conduit is a sleeve surrounding the first channel means thereby forming second channel means which is the annulus between the sleeve and the first channel means. The reference gaseous stream is then suitably heated to a relatively high temperature and passed at high velocity into the second channel means which has the effect of enveloping the sample gas entering the first channel means. This feature of the invention prevents condensate formation in the first channel means. The preheating device or electrically heated catalytic filament assures the transfer of the hydrocarbon particles into the vapor phase for suitable conversion on the catalyst. It was found that the prior art detection devices were unsuitable for handling contaminated gaseous streams containing relatively heavy tars and polymers, since these heavy components inevitably plugged up the prior art devices in a relatively short period of time. By operating in the preferred manner, more fully discussed with reference to the appended drawing, the present invention avoids the problems of plugging and blockage associated with sample gases containing these relatively heavy condensable components.

The invention may be more fully understood with reference to the appended drawing which is a schematic representation embodying the inventive system.

DESCRIPTION OF THE DRAWING

Referring now to the drawing, a feed gas comprising air contaminated with relatively heavy hydrocarbons enters the system via inlet means 10 having associated therewith flow control device 11, such as orifice means. A reference gas stream comprising hot air (heated by means not shown) enters the system through inlet means 12 having associated therewith flow control means 13, such as an orifice device. The hot air passes around first channel means 14, is converted to a high velocity jet stream by means of an inspirator orifice, and envelops the sample stream completely, thereby preventing hydrocarbon impingement on said channel walls. In other words, this is best accomplished by providing in a sample probe a thin film of heated air at high velocity alongside the said first channel wall. The film will thus envelop the sample stream which contains condensable hydrocarbons and keep the latter from contact with the channel walls. Impingement with consequent carbonization of hydrocarbons and plugging of the sample probe is thus prevented.

This portion of the heated reference air passes through the second channel means 15 which is the annulus of the sleeve surrounding first channel means 14. The hot air passes through channel 15 and into first channel means 14 thereby picking up the feed gas and assuring the continued vapor phase of the sample. The introduction of the hot air from 15 into 14 may be by aspirator means (not shown), thereby providing suction or pumping means for introducing the sample into channel 14. In other words, the hot air prevents the condensation of any of the contaminants to be detected which are present in the feed gas which entered the system via inlet means 10.

The feed gas and hot reference air pass through first channel means 14, flow control device 16 which may be of the orifice type, into conversion zone 19 which consists of an electrical preheater and a catalytic combustion cartridge, or a catalyst supported on an electrical filament. Typically, the temperature within conversion zone 19 will be about 450° C. sufficient to convert all combustible material contained in the feed gas to water vapor and carbon dioxide.

The conversion products are withdrawn from conversion zone 19 and passed over detection device, e.g. thermistor 22, which is specific for detecting the conversion products produced in conversion zone 19.

Returning now to the reference air sample which had entered the system via inlet means 12 at a relatively high temperature: another portion of the hot air passes through flow control means 18, which may comprise an orifice device, into channel 17 which is in open communication with conversion zone 20, which, for all practical purposes, is identical to conversion zone 19 in that it comprises an electrical preheater and combustion zone cartridge. The conversion products are withdrawn from conversion zone 20 and passed over detection device, e.g. thermistor 21, which is specific for the detection of the conversion products produced in conversion zone 20.

The exhaust gases formed in channels 17 and 14 are then passed out of the system via outlet means 23.

Thermistors 21 and 22 are connected into a conventional Wheatstone Bridge circuit (not shown) utilizing terminals 24 and 25. Those skilled in the art are intimately familiar with a Wheatstone Bridge circuit of the type suitable to the environment described hereinabove so that greater detail thereof need not be presented herein. However, the difference in temperature between channel 14 and channel 17 as well as the different specific conductivities of the two gas streams contained therein, respectively, will imbalance the Wheatstone Bridge circuit. This imbalance produces an output signal which will be equivalent to the composition of the sample gas stream and with the utilization of conventional potentiometers the correlation between the output signal and the content of the impurity in the sample gas stream may be determined. The correlation technique is also well known to those skilled in the art and need not be described in greater detail herein. For specific purposes determination of humidity of reference and sample gas streams can be accomplished by means of multiple thermocouple measuring devices interconnected to allow compensation of wet bulb against dry bulb junction and subsequent flow of differential current which is equivalent to the humidity of sample and reference streams. This may become desirable when low hydrocarbon concentrations are to be detected. Such multiple thermocouple measuring devices, utilized as humidity detectors, are shown at 28, in feed gas stream 10, and 30, positioned in the reference gas stream 12. The signal thus obtained can be fed into thermistor output to obtain approximate correction for varying degrees of humidity in sample and reference streams.

It is to be noted that flow control means 11, 13, 16, and 18 are designed so that substantially equal volume flow per unit time of each gas stream passes through each conversion zone 19 and 20, respectively.

In some operations it will be within the concepts of the present invention to provide drying means in channels 14 and 17 prior to detection devices 21 and 22 so that all water vapor may be removed from the correlation and the detection devices can be simplified for determining the temperature differences and thermal conductivity differences of the substantially dry conversion products. These drying means have not been shown in the drawing since their use, per se, is well known to those skilled in the art and may include a cartridge containing a desiccant, such as calcium sulfate or magnesium perchlorate.

Also not shown in the drawing, but clearly embodied within the concepts of the present invention is remote control means associated with the output signal so that the exhaust gas returning from a drying oven, for example, may be regulated within the safety combustible limits of the oven environment. In other words, the system of the present invention may be used to measure, indicate, record, and/or control continuously the performance of any atmosphere correction device, such as an air correction device, associated with the exhaust streams being rejected to the atmosphere.

PREFERRED EMBODIMENT

Accordingly, it is a preferred embodiment of the present invention to provide a system for determining the hydrocarbon contaminant content in an air stream which comprises in combination: (a) inlet means for reference air connected in open communication with hereinafter specified first and second channel means; (b) inlet means for hydrocarbon contaminated air into first channel means, the first channel having associated therewith catalytic conversion means for converting said hydrocarbon contaminant substantially into conversion products comprising carbon dioxide and water; (c) second channel means having associated therewith catalytic conversion means for converting any hydrocarbon components contained in the reference air substantially into conversion products comprising carbon dioxide and water; (d) detection means in said first and second channel means selective for at least one of the conversion products; (e) means for generating a signal from said detection means quantitatively correlatable to said contaminant content; and, (f) outlet means for exhausting the conversion products from each channel.

A distinctly preferred embodiment of this invention includes the system hereinabove wherein said inlet means of (a) is further characterized by having said open communication with the first channel comprise the annulus of an external sleeve means around said first channel.

As used herein, the term "reference gas," "known impurity gaseous stream" or other words of similar import are intended to embody a reference gaseous stream which is used to compensate for outside contaminating level which would mask the determination of the unknown impurity content in the sample gaseous stream. Thus, the word "known" is not intended to imply that the actual content of the impurity is necessarily known with certainty, but is intended to include the concept of providing the means for measuring the difference in impurity content between the two gaseous streams so that the difference is correlatable with the impurity content of the sample gas.

I claim:
1. System for determining hydrocarbon contaminant content in an air stream which comprises in combination:

(a) inlet means for reference air connected in open communication with hereinafter specified first and second channel means;
(b) an external sleeve means around said first channel means, said open communication comprising the annulus formed by said sleeve means;
(c) inlet means for hydrocarbon contaminated air into first channel means, the first channel means having associated therewith catalytic conversion means for converting said hydrocarbon contaminant substantially into conversion products comprising carbon dioxide and water;
(d) the second channel means having associated therewith catalytic conversion means for converting any hydrocarbon components contained in the reference air substantially into conversion products comprising carbon dioxide and water;
(e) detection means in each of said first and second channel means selective for the conversion products in said respective channel means;
(f) means for generating a signal from each of said detection means quantitatively correlatable to said contaminant content in said first channel means; and,
(g) outlet means for exhausting the conversion products from each channel.

2. System according to claim 1 wherein volume control means are associated with said first and second channels so that substantially equal volume flow per unit time of each gas stream passes in contact with each of said catalyst conversion means.

3. System according to claim 1 further characterized by detector means in each of said first and second channel means for determinations of relative humidity.

References Cited

UNITED STATES PATENTS

| | | | |
|---|---|---|---|
| 3,039,053 | 6/1962 | Jacobson | 23—254EX |
| 3,110,173 | 11/1963 | Bishop | 73—29X |
| 3,224,838 | 12/1965 | Evans et al. | 23—254EX |

MORRIS O. WOLK, Primary Examiner

R. M. REESE, Assistant Examiner

U.S. Cl. X.R.

23—232